US008268053B2

(12) United States Patent  
Wagner et al.

(10) Patent No.: US 8,268,053 B2
(45) Date of Patent: *Sep. 18, 2012

(54) FLUTED FILTER MEDIA

(75) Inventors: Wayne M. Wagner, Apple Valley, MN (US); Gary R. Gillingham, Prior Lake, MN (US); Joseph C. Tokar, Apple Valley, MN (US); Daniel T. Risch, Burnsville, MN (US); Jim C. Rothman, Burnsville, MN (US); Fred H. Wahlquist, Bloomington, MN (US); Bernard A. Matthys, Apple Valley, MN (US); Gregory L. Reichter, Bloomington, MN (US); Stephen W. Sabelko, Prescott, WI (US); Bryan D. Patten, Bloomington, MN (US)

(73) Assignee: Donaldson Company, Inc., Minneapolis, MN (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/069,660

(22) Filed: Feb. 11, 2008

(65) Prior Publication Data

US 2008/0216654 A1    Sep. 11, 2008

Related U.S. Application Data

(62) Division of application No. 10/371,825, filed on Feb. 21, 2003, now Pat. No. 7,329,326, which is a division of application No. 09/580,091, filed on May 30, 2000, now abandoned, which is a division of application No. 08/639,220, filed on Apr. 26, 1996, now abandoned.

(51) Int. Cl.
    *B01D 46/00* (2006.01)
(52) U.S. Cl. ........... 95/273; 55/520; 55/523; 55/DIG. 5; 55/521; 55/498; 95/268

(58) Field of Classification Search .............. 95/273, 95/268; 55/498, 521, DIG. 5, 520, 523; 156/184, 156/205, 507, 210, 269; 428/167; 210/493.3, 210/493.4; 264/69, 219, 228, 239, DIG. 48
See application file for complete search history.

(56) References Cited

U.S. PATENT DOCUMENTS 678,999 A    7/1901   Hobbs
(Continued)

FOREIGN PATENT DOCUMENTS

DE    671096    2/1939
(Continued)

OTHER PUBLICATIONS

Exhibit A, Notice of Grounds for Rejection, Patent Application No. 9-539102, mailed Jan. 8, 2008, 6 pgs., original and translation.
(Continued)

*Primary Examiner* — Jason M Greene
*Assistant Examiner* — Karla Hawkins
(74) *Attorney, Agent, or Firm* — Merchant & Gould, P.C.

(57) ABSTRACT

Fluted filter media includes filter material having a plurality of flutes formed therein having alternating ends of adjacent flutes closed to force fluid through filter material. A first embodiment of the filter media includes tapered flutes which have the open ends of the flutes larger in cross-section than the closed flutes, wherein the upstream open flutes converge toward the downstream end and the upstream closed end flutes diverge toward the downstream end. A second embodiment includes filter media which is asymmetric formed with dissimilar upstream and downstream flute cross-sections with larger flute openings to the upstream side of the filter. A third embodiment includes filter media with an upstream edge crushed to improve flow at the upstream edge. A fourth embodiment includes filter media with the upstream sealing material recessed from the upstream edge for reducing effects from blockages at the upstream edge of the filter.

5 Claims, 16 Drawing Sheets

U.S. PATENT DOCUMENTS

| | | | |
|---|---|---|---|
| 891,428 A | | 6/1908 | Latus |
| 1,729,135 A | | 9/1929 | Slauson |
| 2,019,186 A | | 10/1935 | Kaiser |
| 2,038,071 A | | 4/1936 | Wilhelm |
| 2,190,886 A | | 2/1940 | Schaaf et al. |
| 2,397,759 A | | 4/1946 | Sigmund |
| 2,599,604 A | | 6/1952 | Bauer et al. |
| 2,887,177 A | | 5/1959 | Mund et al. |
| 3,020,977 A | | 2/1962 | Huppke et al. |
| 3,025,963 A | * | 3/1962 | Bauer ................. 210/493.4 |
| 3,025,964 A | | 3/1962 | Summers et al. |
| 3,037,637 A | | 6/1962 | Bub |
| 3,070,937 A | | 1/1963 | Bub |
| 3,076,554 A | | 2/1963 | Bub |
| 3,112,184 A | | 11/1963 | Hollenbach |
| 3,112,262 A | | 11/1963 | Parkinson |
| 3,247,813 A | * | 4/1966 | Hart et al. ............. 112/470.27 |
| 3,323,963 A | | 6/1967 | Summers |
| 3,346,121 A | | 10/1967 | Bally |
| 3,372,533 A | | 3/1968 | Rummel |
| 3,401,803 A | | 9/1968 | Bub |
| 3,640,396 A | | 2/1972 | Brownell |
| 3,859,068 A | | 1/1975 | McLaren et al. |
| 4,039,457 A | | 8/1977 | Schacht et al. |
| 4,065,341 A | | 12/1977 | Cub |
| 4,158,449 A | | 6/1979 | Sun et al. |
| 4,159,899 A | | 7/1979 | Deschenes |
| 4,162,906 A | | 7/1979 | Sullivan et al. |
| 4,181,513 A | | 1/1980 | Fukuda et al. |
| 4,310,419 A | | 1/1982 | Nara et al. |
| 4,410,427 A | | 10/1983 | Wydeven |
| 4,430,223 A | | 2/1984 | Miyakawa et al. |
| 4,439,321 A | | 3/1984 | Taki et al. |
| 4,441,899 A | | 4/1984 | Takagi et al. |
| 4,460,388 A | | 7/1984 | Fukami et al. |
| 4,512,891 A | | 4/1985 | Wright et al. |
| 4,537,608 A | | 8/1985 | Koslow |
| 4,589,983 A | | 5/1986 | Wydevan |
| 4,652,286 A | | 3/1987 | Kusuda et al. |
| 4,695,300 A | | 9/1987 | Takagi |
| 4,704,863 A | | 11/1987 | Abthoff et al. |
| 4,728,426 A | | 3/1988 | Rudinger et al. |
| 4,925,561 A | | 5/1990 | Ishii et al. |
| 5,002,666 A | | 3/1991 | Matsumoto et al. |
| 5,015,379 A | | 5/1991 | Drori |
| 5,063,007 A | | 11/1991 | Gabathuler et al. |
| 5,066,432 A | | 11/1991 | Gabathuler et al. |
| 5,174,895 A | | 12/1992 | Drori |
| 5,316,676 A | | 5/1994 | Drori |
| 5,322,537 A | | 6/1994 | Nakamura et al. |
| 5,405,422 A | | 4/1995 | Ueda et al. |
| 5,405,423 A | | 4/1995 | Haerle |
| 5,435,870 A | * | 7/1995 | Takagaki et al. ............. 156/189 |
| 5,512,075 A | | 4/1996 | Ninomiya et al. |
| 5,543,007 A | | 8/1996 | Takagaki et al. |
| 5,562,825 A | * | 10/1996 | Yamada et al. .......... 210/321.74 |
| 5,797,832 A | | 8/1998 | Ong et al. |
| 5,820,646 A | | 10/1998 | Gillingham et al. |
| 5,856,860 A | * | 1/1999 | Bhalakia et al. ............. 351/168 |
| D417,268 S | | 11/1999 | Gillingham |
| 6,179,890 B1 | | 1/2001 | Ramos et al. |
| 6,190,432 B1 | | 2/2001 | Gieseke et al. |
| 6,235,195 B1 | | 5/2001 | Tokar |
| 6,350,291 B1 | | 2/2002 | Gieseke et al. |
| 6,416,605 B1 | | 7/2002 | Golden |
| 6,517,598 B2 | | 2/2003 | Anderson et al. |
| 6,610,117 B2 | | 8/2003 | Gieseke et al. |
| 6,783,565 B2 | | 8/2004 | Gieseke et al. |
| 6,887,343 B2 | | 5/2005 | Schukar et al. |
| 7,303,604 B2 | | 12/2007 | Gieseke et al. |
| 7,318,851 B2 | | 1/2008 | Brown et al. |
| 7,329,326 B2 | | 2/2008 | Wagner et al. |
| 2002/0096247 A1 | * | 7/2002 | Wydeven ................ 156/210 |
| 2002/0185007 A1 | | 12/2002 | Xu et al. |
| 2006/0091084 A1 | | 5/2006 | Merritt et al. |

FOREIGN PATENT DOCUMENTS

| | | |
|---|---|---|
| EP | 0 630 672 A1 | 12/1994 |
| FR | 1193833 | 11/1959 |
| FR | 2148726 | 3/1973 |
| GB | 868058 | 5/1961 |
| GB | 1 213 219 | 11/1970 |
| GB | 1 579 883 | 11/1980 |
| JP | S56 133005 | 10/1981 |
| JP | 60-112320 | 6/1985 |
| JP | 60-193216 | 12/1985 |
| JP | 64-38121 | 2/1989 |
| JP | 1-171615 | 7/1989 |
| JP | H01 207112 | 8/1989 |
| JP | H01 128811 | 9/1989 |
| JP | HEI 128811 | 9/1989 |
| JP | 2-25009 | 2/1990 |
| JP | 327910 | * 11/1994 |
| JP | H06 327910 | 11/1994 |
| JP | 2001-310402 | 11/2001 |

OTHER PUBLICATIONS

Amended Complaint (with Exhibits) and Demand for Jury Trial, Baldwin Filters, Inc., United States District Court District of Minnesota, Civil No. 0:09-cv-01049-JMR-AJB, dated Aug. 27, 2010.

Answer and Counterclaims of Baldwin Filters, Inc. to Donaldson Company, Inc.'s Amended Complaint and Demand for Jury Trial; Baldwin Filters, Inc., United States District Court District of Minnesota, Civil No. 0:09-cv-01049-JMR-AJB, dated Sep. 10, 2010 (with exhibits).

Defendant's Prior Art Statement For '326 Patent, United States District Court District of Minnesota, Civil No. 0:09-cv-01049-JMR-AJB, dated Oct. 29, 2010.

Markman Order Donaldson Company, Inc., Baldwin Filters, Inc., Civil No. 0:09-cv-01049-PJS-AJB, dated Jun. 6, 2011.

* cited by examiner

FLUTED FILTER MEDIA

CROSS REFERENCE RELATED APPLICATION

This application is a divisional of application Ser. No. 10/371,825, filed Feb. 21, 2003, that issued as U.S. Pat. No. 7,329,326. Application Ser. No. 10/371,825 is a divisional of application Ser. No. 09/580,091, now abandoned, filed May 30, 2000, which is a divisional of application Ser. No. 08/639,220, now abandoned, filed Apr. 26, 1996. The disclosures of application Ser. Nos. 10/371,825, 09/580,091, and 08/639,220 are incorporated herein by reference

BACKGROUND OF THE INVENTION

1. Field of the Invention

The present invention relates to fluted filter media, and in particular, to fluted filter media having flutes which minimize restriction across the filter.

2. Prior Art

Pleated filters which utilize filter media to remove contaminants from fluids are commonly known and take on many configurations.

A common problem with filters is inadequate filter surface area. Prior attempts to improve filtering surface area for a given filter volume have not been entirely successful. Pleated filters are commonly used which utilize a pleated filter media in an attempt to overcome this shortcoming. Although pleated filter material may increase the filter area, as the pleats are placed closer and closer together, thereby placing more and more filter media in a given volume, the pleats are pressed tighter and tighter together, thereby restricting the flow. This restriction may cause the velocity of flow to increase in order to pass through the filtering media, thereby increasing the pressure differential across the filter which may cause additional problems in the system.

Most permeable filter media does not provide structural support so that the filters require housings for supporting the filtering material. This increases manufacturing costs as well as the mass and size of the filter.

To improve restriction and provide increased media area, as well as filter efficiency, fluted filter configurations may be utilized. Fluted filters have the capability of increased media area per unit volume, as well as less restriction and substantially straight-through flow.

Although fluted filters provide improved flow characteristics and efficiency over prior filter designs, fluted filters have the possibility of greater efficiency and improved flow characteristics. The sealed upstream ends of flutes provide a substantial blockage of the flow, and when combined with the filter material, more than half of the available cross sectional area of the fluid flow is blocked. Filter designs which have greater cross sectional area transverse to the flow provide improved flow and restriction characteristics.

It can be seen that new and improved filters are needed which provide self support, improved restriction, improved flow characteristics, and greater efficiency. In particular, fluted filters should have a leading edge which provides less resistance and takes up less of the cross-sectional flow area than standard flute designs. In addition, the cross-sectional area of the filter media and the closed ends of the flutes at the upstream edge should be smaller than the opening area at the upstream edge of the flutes. Such improved filter designs should also be easily manufactured without undue additional steps. The present invention addresses these as well as other problems associated with filter designs.

SUMMARY OF THE INVENTION

The present invention is directed to a fluted filter device, and in particular, to fluted filter media with improved flow characteristics.

According to a first embodiment of the present invention, fluted filter media includes a fluting center sheet intermediate a top and bottom layer. It can be appreciated that the filter media may be wound or otherwise stacked so that only a single sheet need be attached to a fluting sheet, as adjacent layers will serve as either the top or bottom sheet of the next adjacent layer. In addition, the layers may be wound in a spiral configuration. Alternating ends of adjacent chambers formed by the fluted material are blocked on either the upstream or downstream side. The first embodiment has tapered flutes which widen from one end to the other. The fluted chambers having their upstream end closed widen to an open downstream end. Conversely, the downstream closed fluted chambers widen to an open upstream end.

It can be appreciated that with this configuration, the area of the filter media transverse to the upstream flow includes a large portion open to the chambers for receiving the flow. As the flow filters through the various filter material sheets, the filtered fluid passes through an enlarged downstream end as well. In this manner, the restriction due to the filter is substantially decreased over standard fluted filter materials. In addition, the percentage of bead material and the upstream edge of the filter sheets is substantially less than the open area receiving the upstream flow.

According to a second embodiment of the present invention, fluted filter media includes asymmetric flutes which have a substantially sharp peak and a widened trough. The area above the trough is open to the upstream flow. In this manner, the upstream openings at the edge of the filter media have a larger cross sectional area transverse to the flow than the area of the closed flutes and the upstream edge of the filter material. This configuration provides improved flow with greater filter efficiency and reduced restriction across the filter.

According to a third embodiment of the present invention, fluted filter media includes a crushed upstream edge providing for improved flow. According to the third embodiment, the leading edge of the filter media includes beads blocking alternating chambers of the filter flutes. The upstream edge of the bead and fluting sheet are angled so that a widened edge intercepts the flow and angles toward the downstream end. As the flow intercepts the upstream edge, only the leading sheeting edge contacts the upstream flow and the bead and fluting sheet angle rearward. With this configuration, the resistance and proportion of the filter media intercepting the upstream flow at the leading edge of the filter is reduced. Therefore, improved flow is attained which provides for increased efficiency and reduced restriction across the filter.

These and various other advantages and features of novelty which characterize the invention are pointed out with particularity in the claims annexed hereto and forming a part hereof. However, for a better understanding of the invention, its advantages, and the objects obtained by its use, reference should be made to the drawings which form a further part hereof, and to the accompanying descriptive matter, in which there is illustrated and described a preferred embodiment of the invention.

BRIEF DESCRIPTION OF THE DRAWINGS

In the drawings, wherein like reference letters and numerals designate corresponding elements throughout the several views.

DETAILED DESCRIPTION OF THE PREFERRED EMBODIMENTS

Figure 1:
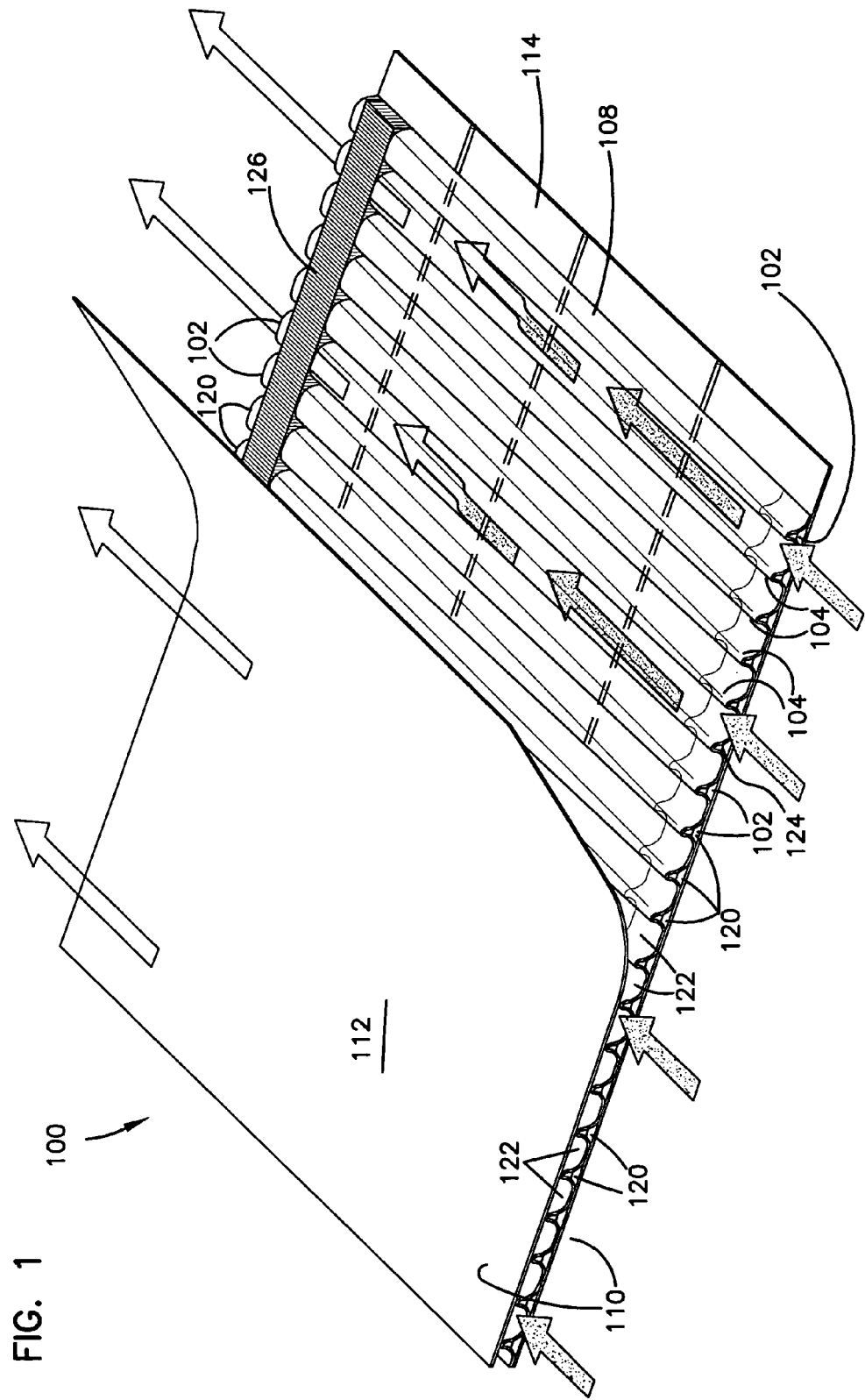
FIG. 1 shows a perspective view of a first embodiment of double-faced fluted filter media having tapered flutes according to the principles of the present invention.

Referring now to the drawings, and in particular to FIG. 1, there is shown a portion of a layer of double-faced permeable fluted filter media, generally designated 100. The first embodiment of the fluted filter media 100 includes a multiplicity of tapered flute chambers 102. The flute chambers 102 are formed by a center fluting sheet 108 forming alternating peaks 104 and troughs 106 between facing sheets 110, including a first facing sheet 112 and a second facing sheet 114. The troughs 106 and peaks 104 divide the flutes 102 into an upper row and lower row. In the configuration shown in FIG. 1, the upper flutes form flute chambers 122 closed at the downstream end, while upstream closed end flute chambers 120 are the lower row of flute chambers. The fluted chambers 120 are closed by first end bead 124 completely filling a section of the upstream end of the flute between the center fluting sheet 108 and the second facing sheet 114. Similarly, a second end bead 126 closes the downstream end of alternating flutes 102. Adhesive tacks connect the peaks 104 and troughs 106 of the flutes 102 to the facing sheets 112 and 114. The flutes 102 and end beads 124 and 126 provide a filter element which is structurally self-supporting without a housing.

During filtration, unfiltered fluid enters the flute chambers 122 which have their upstream ends open, as indicated by the shaded arrows. Upon entering the flute chambers 122, the unfiltered fluid flow is closed off by the second end bead 126 at the downstream end. Therefore, the fluid is forced to proceed through the fluting sheet 108 or face sheets 110. As the unfiltered fluid passes through the fluting sheet 108 or face sheets 110, the fluid is filtered through the filter media layers, as indicated by the unshaded arrow. The fluid is then free to pass through the flute chambers 120, which have their upstream end closed and to flow out the open downstream end out the filter media 100. With the configuration shown, the unfiltered fluid can filter through the fluted sheet 108, the upper facing sheet 112 or lower facing sheet 114, and into a flute chamber 120 blocked on its upstream side.

Figure 2A:
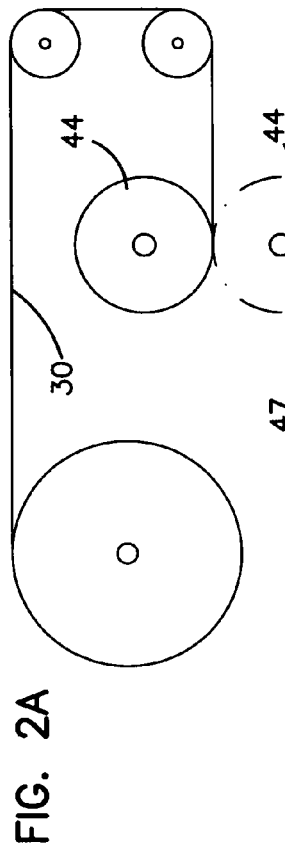
FIGS. 2A-2B show diagrammatic views of the process of manufacturing the filter media shown in FIG. 1.
Figure 2B:
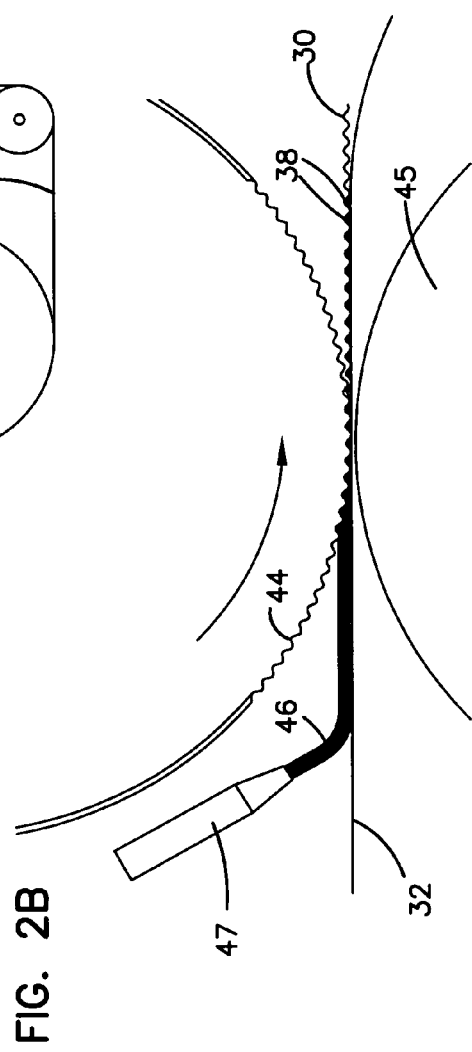

Referring now to FIGS. 2A-2B, the manufacturing process for fluted filter media, which may be stacked or rolled to form filter elements, as explained hereinafter, is shown. It can be appreciated that when the filter media is layered or spiraled, with adjacent layers contacting one another, only one facing sheet 110 is required as it can serve as the top for one fluted layer and the bottom sheet for another fluted layer. Therefore, it can be appreciated that the fluted sheet 108 need be applied to only one facing sheet 110 when the layers are stacked or rolled.

As shown in FIG. 2A, a first filtering media sheet 30 is delivered from a series of rollers to opposed crimping rollers 44 forming a nip. The rollers 44 have intermeshing wavy surfaces to crimp the first sheet 30 as it is pinched between the rollers 44. As shown in FIG. 2B, the first now corrugated sheet 30, and a second flat sheet of filter media 32 are fed together to a second nip formed between one of the crimping rollers 44 and an opposed roller 45. A sealant applicator 47 applies a sealant 46 along the upper surface of the second sheet 32 prior to engagement between the crimping roller 44 and the opposed roller 45. At the beginning of a manufacturing run, as the first sheet 30 and second sheet 32 pass through the rollers 44 and 45, the sheets fall away. However as sealant 46 is applied, the sealant 46 forms first end bead 38 between the fluted sheet 30 and the facing sheet 32. The peaks 26 and troughs 28 have tacking beads 42 applied at spaced intervals along their apex or are otherwise attached to the facing sheet 32 to form flute chambers 34. The resultant structure of the facing sheet 32 sealed at one edge to the fluted sheet 30 is single-faced layerable filter media. If the layers are stacked or spiraled, a second bead is applied at an opposite edge to the fluted sheet 30. If the layers are not stacked or spiraled, a second bead is applied at an opposite edge and a second facing sheet is applied.

Figure 3:
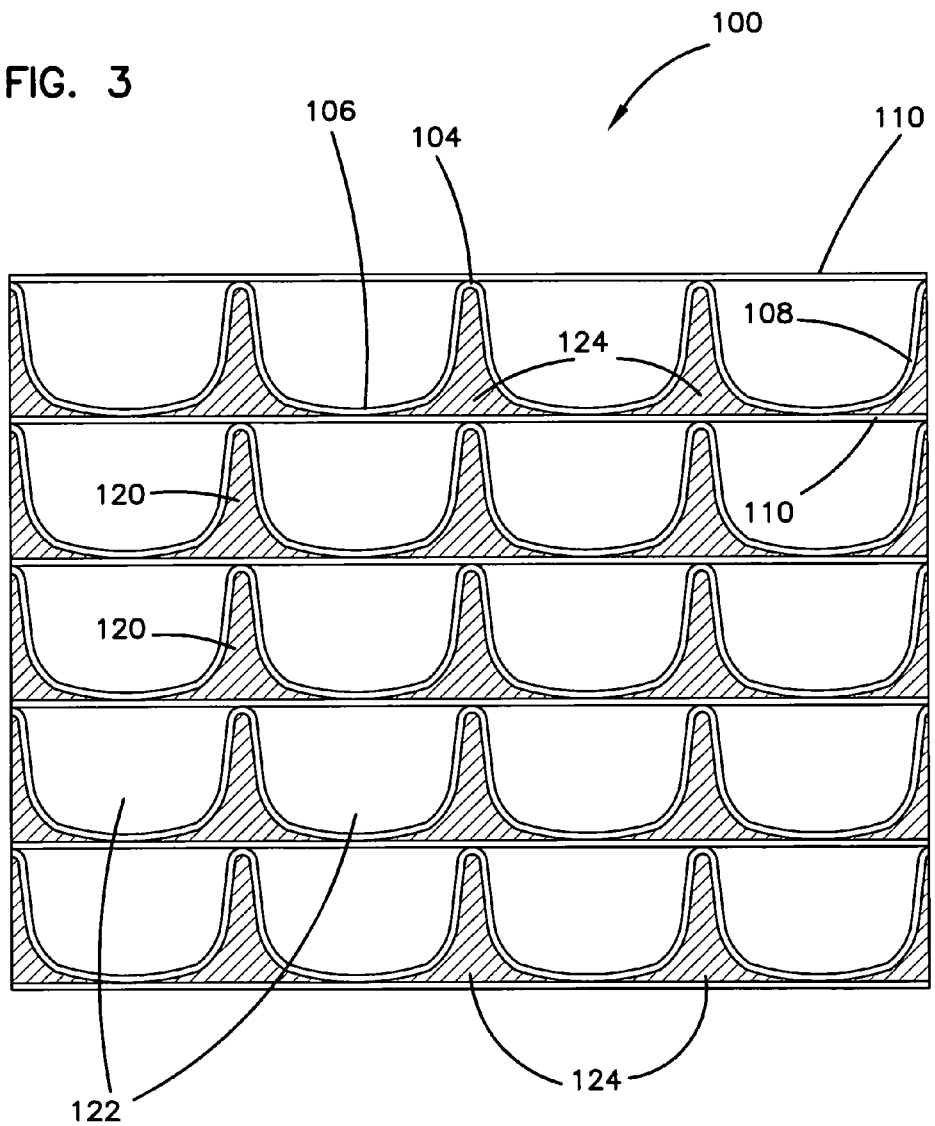
FIG. 3 shows an end elevational view of the filter media shown in FIG. 1.

Referring again to FIG. 1, it can be appreciated that the flutes 102 taper. The fluted chambers 120 having their upstream end closed, widen along the trough to an enlarged downstream opening, as shown in FIG. 3. Similarly, chambers 122 have a large upstream opening, also shown in FIG. 3, and taper to a narrowed closed end. In this manner, the portion of the filter media intercepting the upstream flow that is open is substantially increased. In addition, as the fluid flows along the flutes and passes through the walls of the filter media, either center sheet 108 or facing sheets 112 or 114, the fluid will flow out an enlarged open end on the downstream side of the filter.

Figure 4:
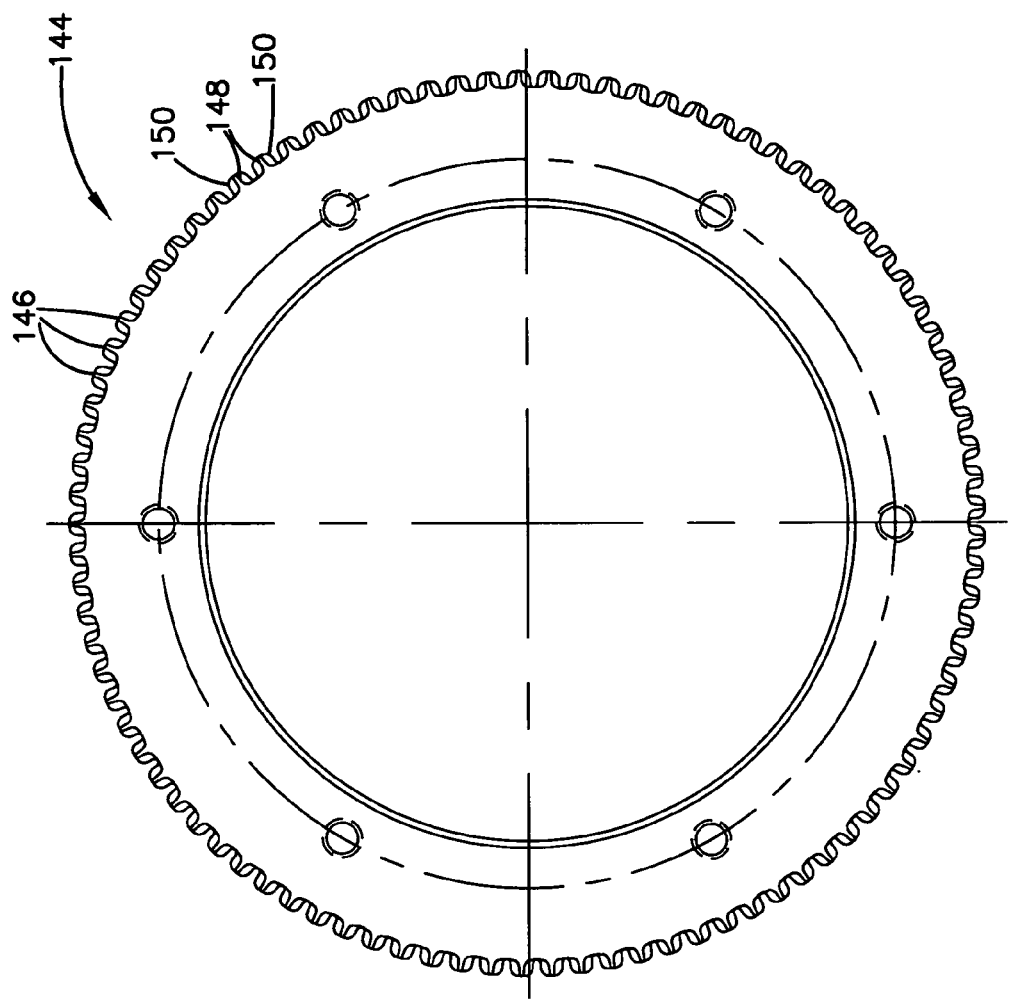
FIG. 4 shows an end elevational view of a roller for forming the filter media shown in FIG. 1.
Figure 5:
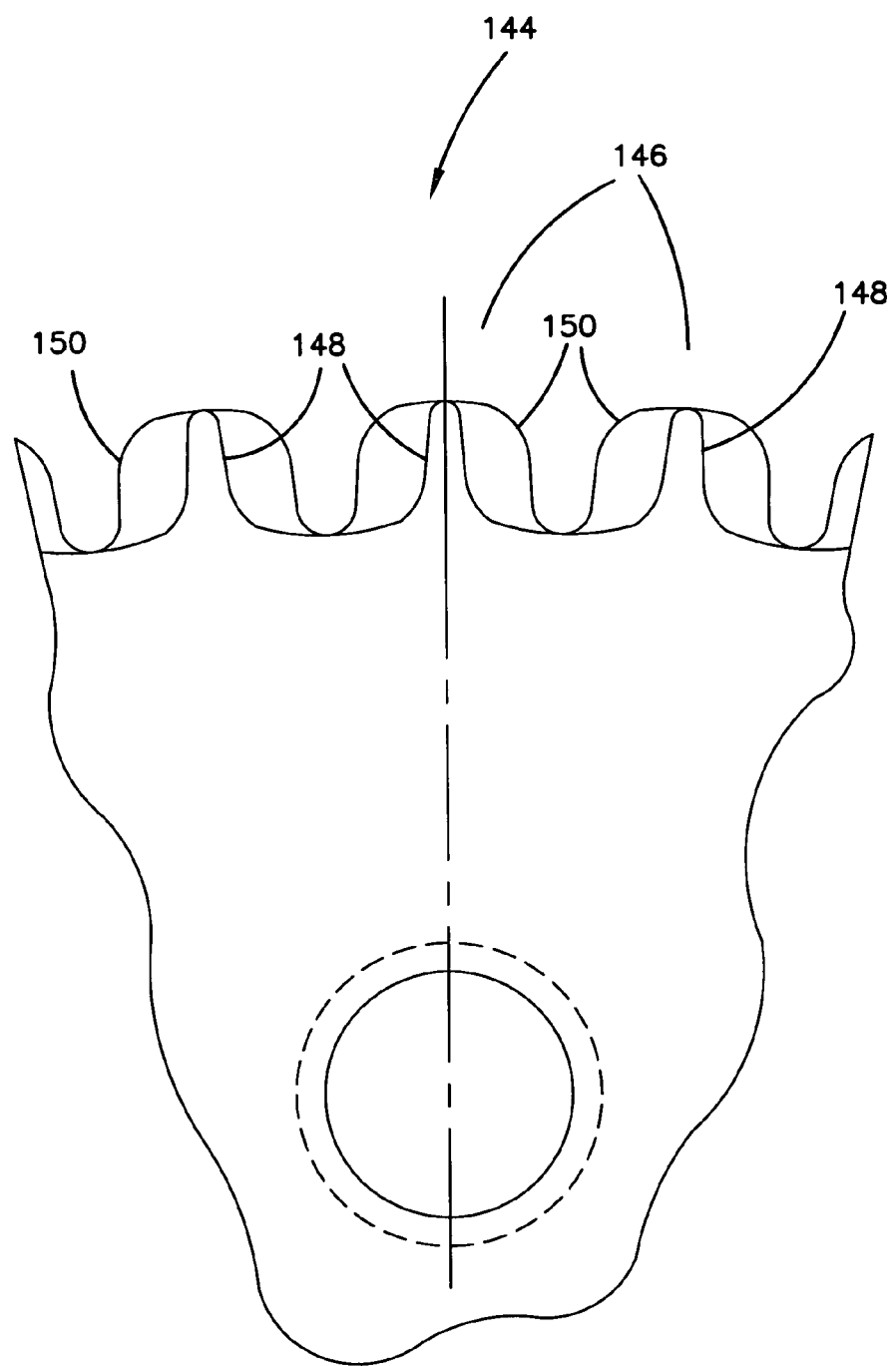
FIG. 5 shows a detailed end view of the teeth for the roller shown in FIG. 4.

It can be appreciated that to manufacture the tapered flutes 102, a special roller 144 is required, shown in FIG. 4. The roller 144 includes a peripheral surface having a multiplicity of aligned teeth 146 formed thereon. The tapering teeth 146 taper from a narrow first end to a widened second end, as shown more clearly in FIG. 5. It can be appreciated that complementary teeth 147 on an opposing roller 145 taper from a narrowed second end to a widened first end. Therefore, as the facing sheet of the center sheet 108 is fed through the nip of the complementary rollers 144, the filter media is crimped to form peaks 104 and troughs 106 which taper in alternate directions along their length. It can be appreciated that the beads 124 and 126 provide filter media which is structurally self-supporting.

As shown in FIG. 3, the resulting filter media 100 includes tapered flute chambers 120 which have a closed upstream end and flute chambers 122 which have an open upstream end. It can be appreciated that with tapered flutes 102, flute chambers 122 have a larger cross sectional area transverse to the flow than the chambers 122 which have their upstream ends closed. It can also be appreciated that the cross sectional area transverse to the flow of the fluted chambers 120 is larger than the cross sectional area of the closed chambers 122 and the edges of the sheets 108, 112 and 114. In this manner, the filter media 100 intercepts greater flow with less resistance. As the flute chambers 120 and 122 taper inversely to one another, the ends of the chambers are reversed in size at the downstream edge. With this configuration, it can be appreciated that the flute chambers 120 have a much smaller cross section at the closed downstream end of the filter media 100 and the flute chambers 122 have a much larger cross sectional area. Therefore, the flow passes in through the larger openings of chambers 120 and out through the enlarged open downstream ends of flute chambers 122. With this configuration, flow passes through filter material having much greater open space with less resistance, while still providing sufficient filter media area in the same volume.

Figure 6:
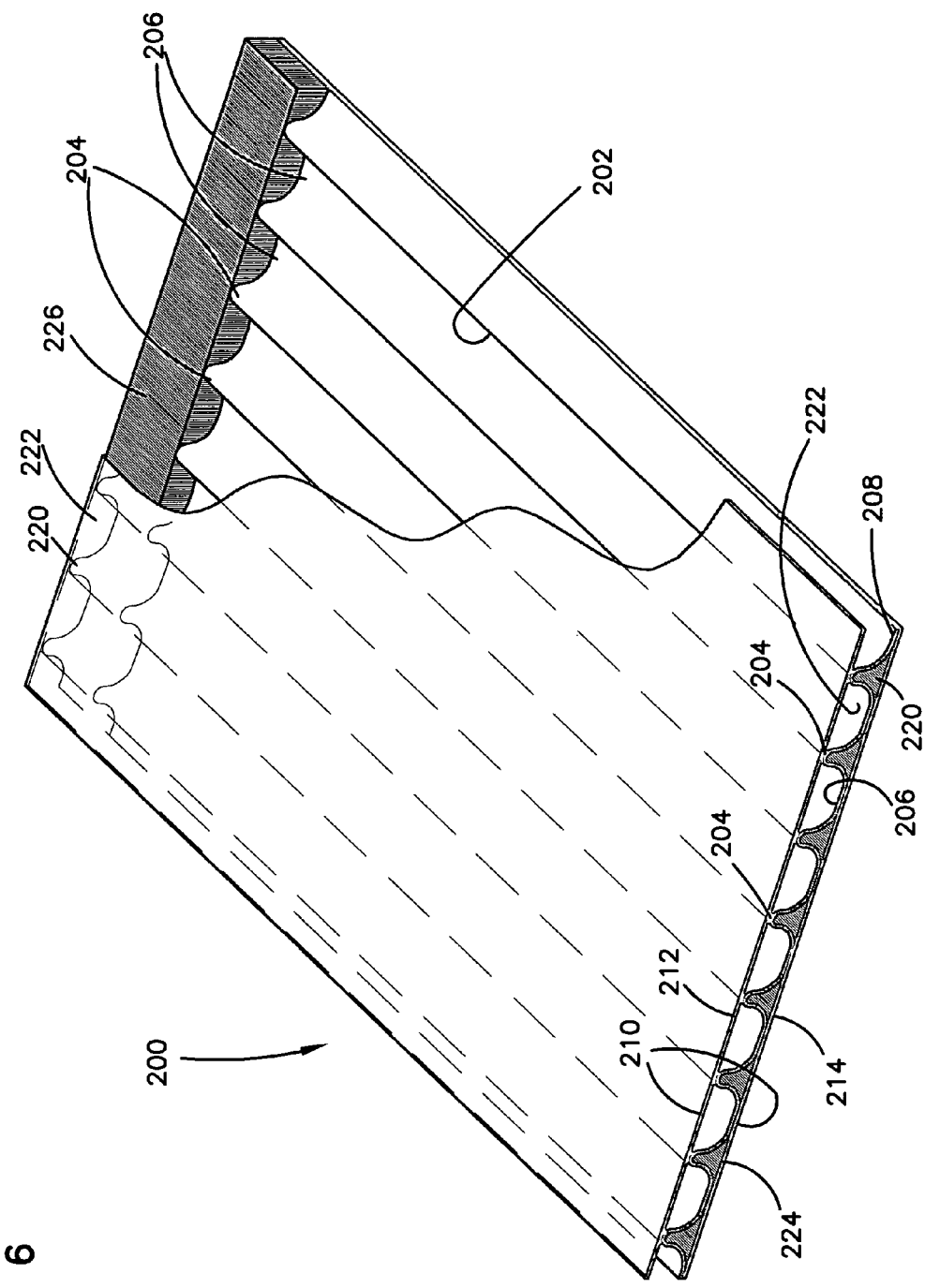
FIG. 6 shows a perspective view of a second embodiment of filter media having asymmetric flutes according to the principles of the present invention.

Referring now to FIG. 6, there is shown a second embodiment of filter media, generally designated 200, having asymmetric flutes according to the principles of the present invention. The filter media 200 includes asymmetric flutes 202 forming substantially narrower peaks 204 and widened arcing troughs 206. The radius of the arc of the peaks 204 is less than the radius of the arc of the troughs 206 of the asymmetric flutes 202. The filter media 200 includes a center sheet 208 and facing sheets 210, including a first upper facing sheet 212 and a second lower facing sheet 214.

The facing sheets 210 are connected by upstream beads 224 and downstream beads 226. In this manner, the sheets 208, 212 and 214 form chambers 220 having their upstream ends closed and chambers 222 having their downstream ends closed.

It can be appreciated that with the configuration shown in FIG. 6, the upstream portion of the filter media 200 intercepting flow includes an enlarged opening for the chambers 222. In this manner, increased flow is intercepted by the fluted chambers 222 which then flow through the sheets 208, 212 and 214 and through the chambers 220. In addition, the asymmetric fluted filter media 200 provides for a self-supporting filter structure.

Figure 7:
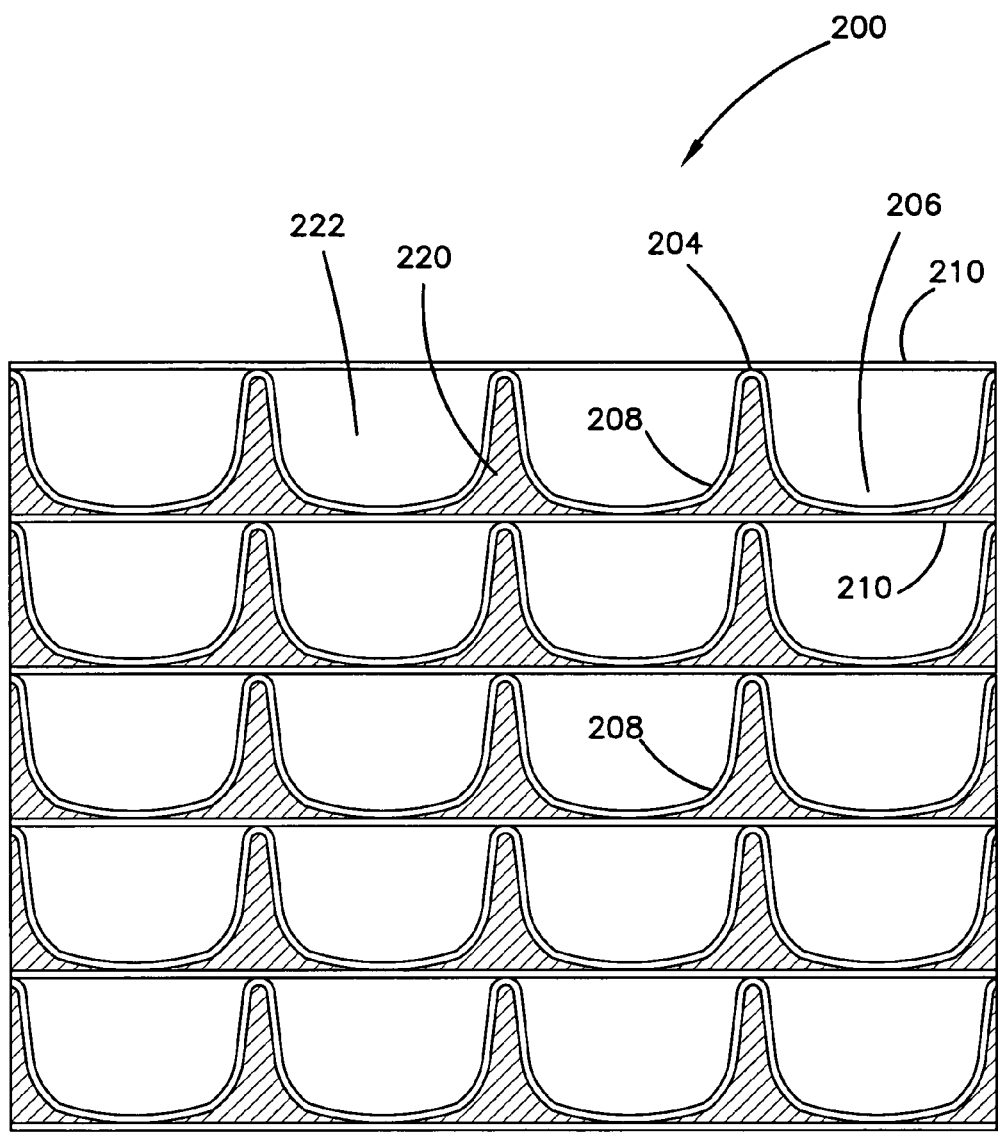
FIG. 7 shows an end elevational view of the filter media shown in FIG. 6.

Referring now to FIG. 7, the open end of the chambers 222 is substantially larger than the bead 224 at the upstream end and the surface area transverse to the flow of the sheets 208, 212 and 214. This arrangement decreases the restriction at the filter inlet and provides for improved flow and dust loading capacity.

Figure 8:
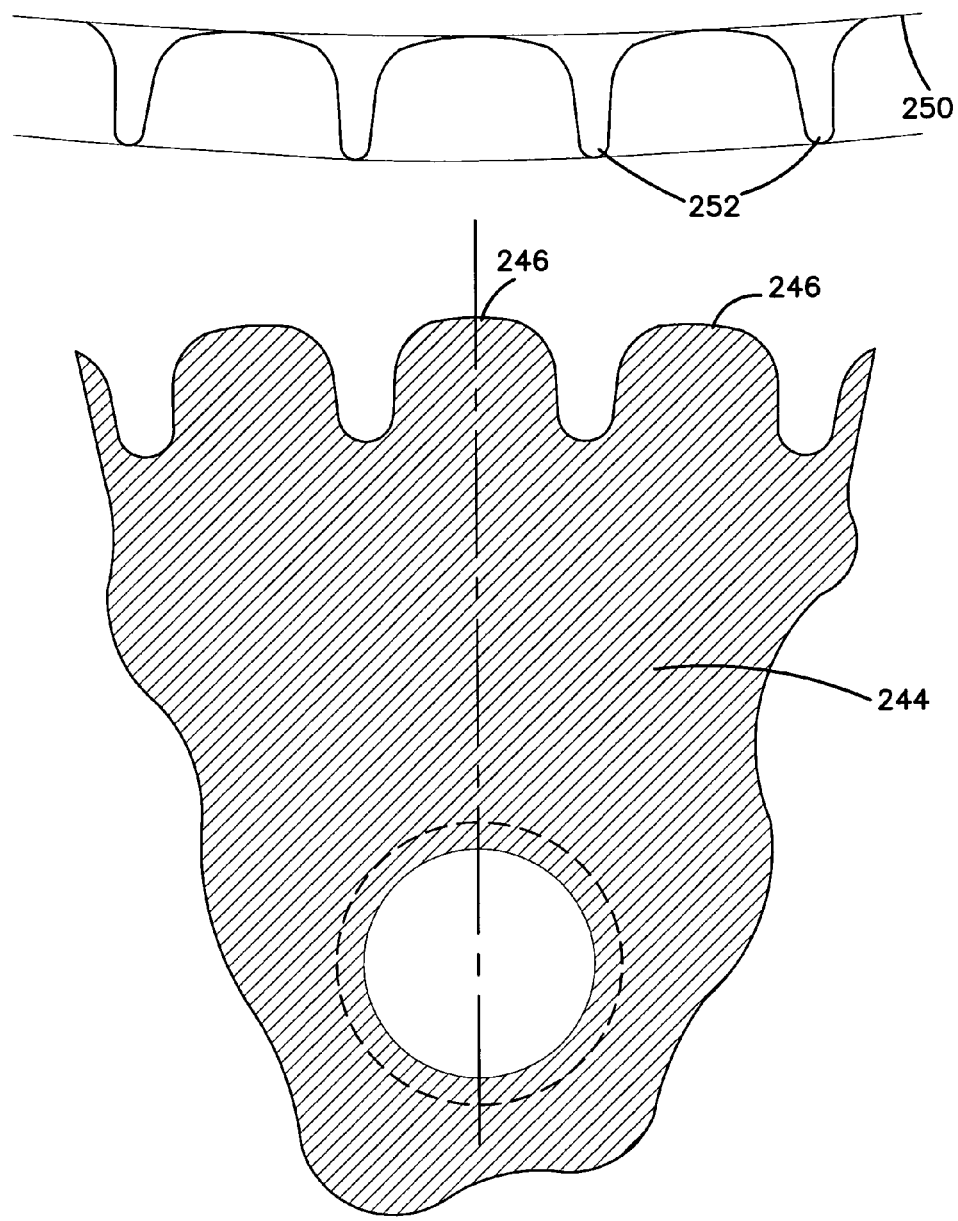
FIG. 8 shows an end elevational view of a roller for forming the filter media shown in FIG. 6.

Referring now to FIG. 8, roller 244 for forming the asymmetric fluted filter media 200 includes a multiplicity of teeth 246 along its periphery. The teeth 246 of a first roller 244 will have a widened outer surface with a narrow trough formed therebetween. The complementary roller would have narrowed teeth with a widened trough formed therebetween for intermeshing with the teeth 246. It can be appreciated that as the rollers engage filter material fed therebetween, asymmetric peaks and troughs are formed in the fluted filter material.

Figure 9:
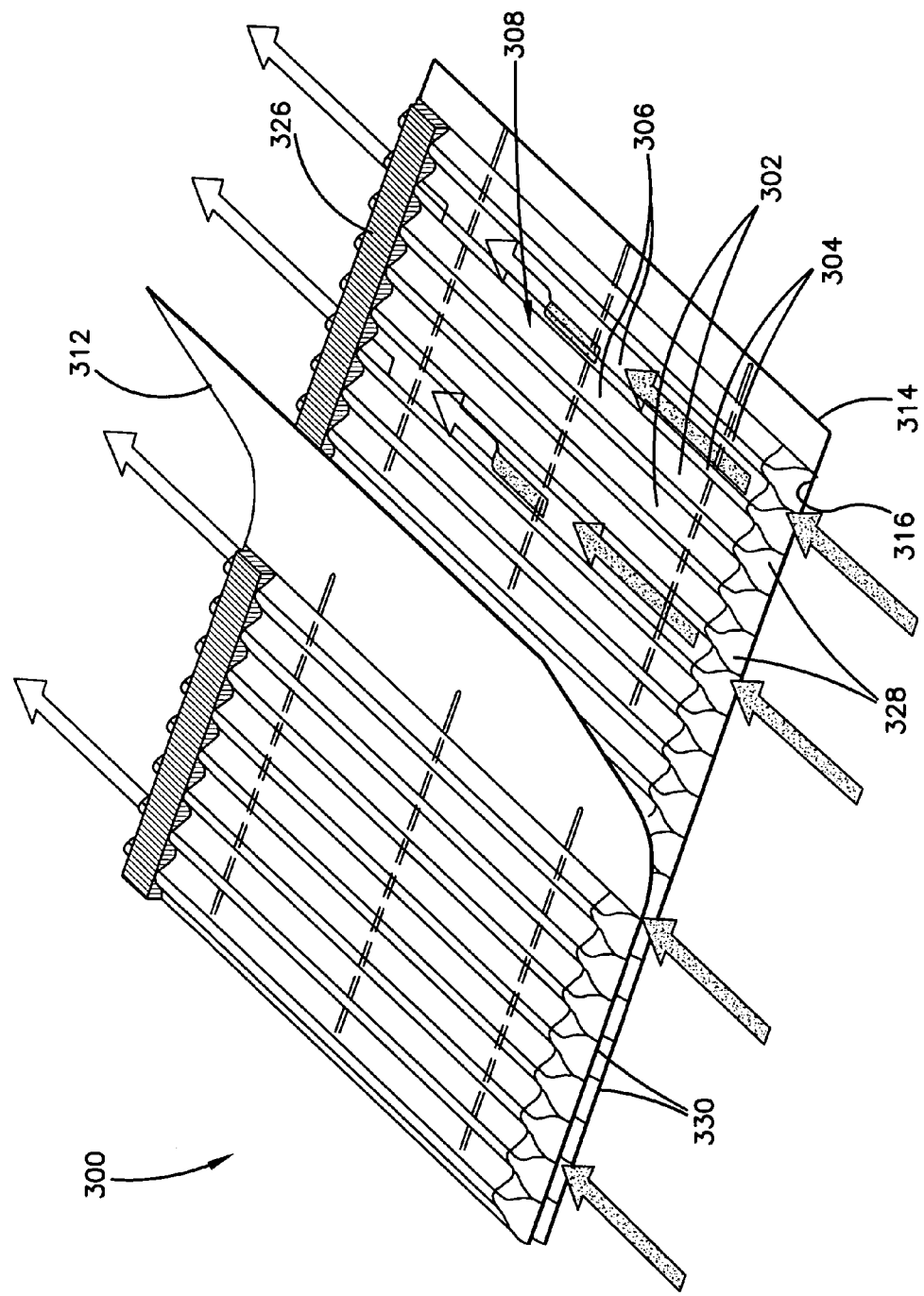
FIG. 9 shows a perspective view of a third embodiment of filter media having crushed leading flute edges according to the principles of the present invention.
Figure 10:
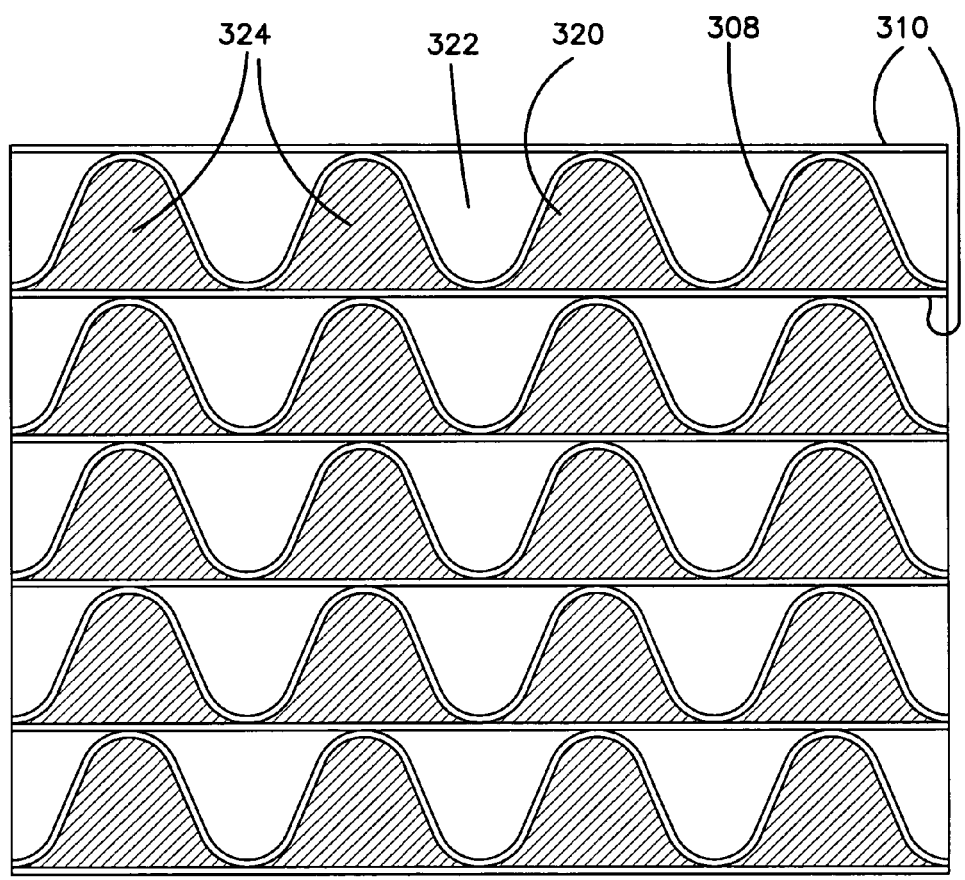
FIG. 10 shows an end elevational view of the filter media shown in FIG. 9.

Referring now to FIG. 9, there is shown another embodiment of the present invention having crushed filter media, generally designated 300. The crushed filter media includes flutes 302 having a crushed upstream edge 316. The flutes include peaks 304 and troughs 306 formed by a fluted center sheet 308. Facing sheets 310 sandwich the center sheet 308 to form fluted chambers 320 and 322. A first facing sheet 312 contacts the upper surface of the flutes, while a lower facing sheet 314 contacts the bottom of the flutes. The filter media 300 includes an upstream bead 324 and a downstream bead 326. The cross section of the flutes from the downstream end appears as in FIG. 10. The cross sectional view from the upstream ends would be reversed from that shown with the open and closed portions being opposite.

Figure 11:
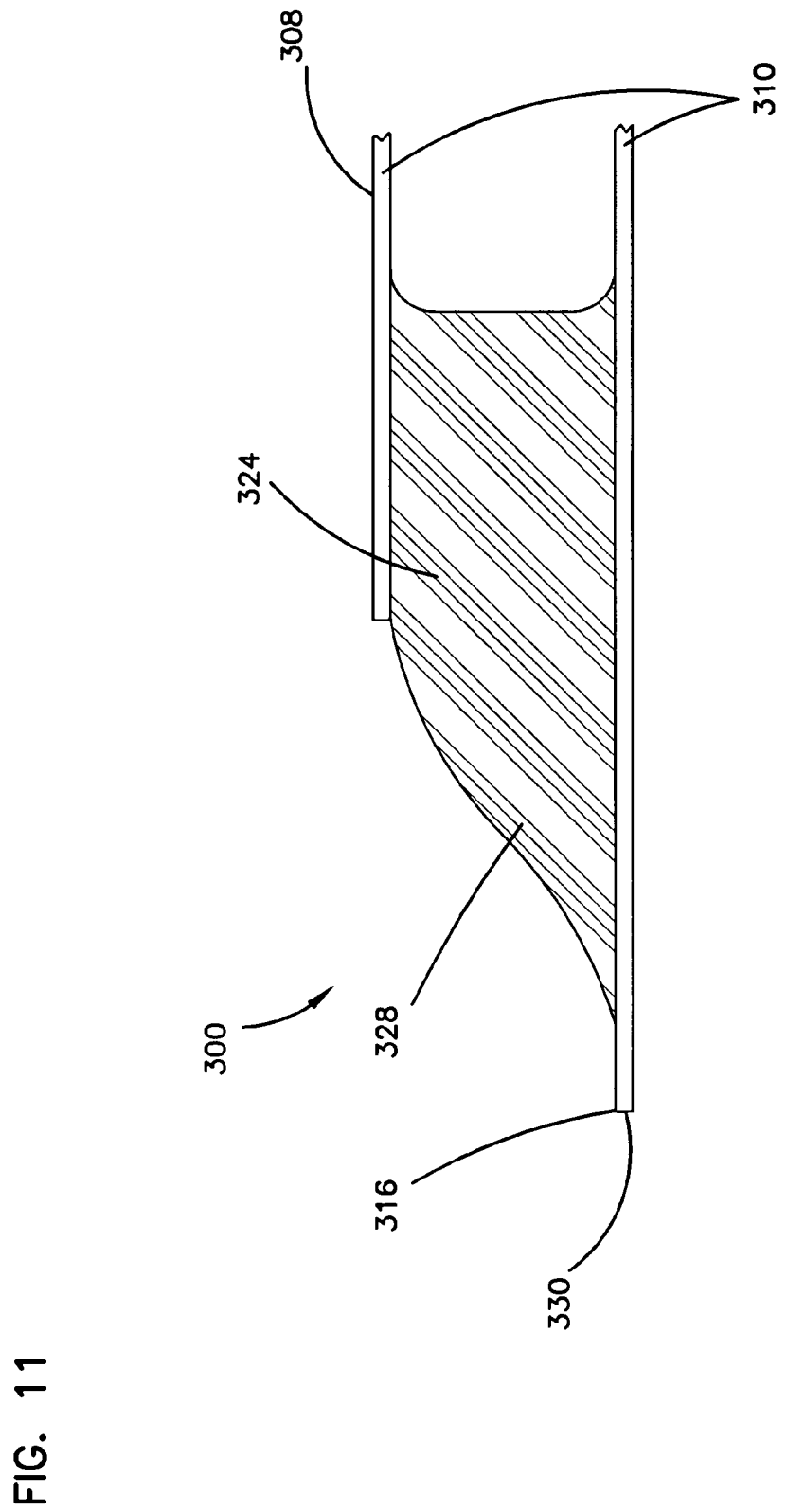
FIG. 11 shows a side sectional view of the leading edge of the filter media shown in FIG. 9.

As shown in FIG. 11, the upstream side of the filter media 300 includes a crushed edge 316 along the upstream bead 324. This forms a sloping surface 328 of the bead 324 and center sheet 308 which engages the flow. The slope provides less resistance while greater flow is achieved, so that the restriction across the filter media is reduced. It can be appreciated that the filter material and bead engaging the flow at the edge 330 is less than the open area intercepting the flow, improving efficiency and flow.

Figure 15:
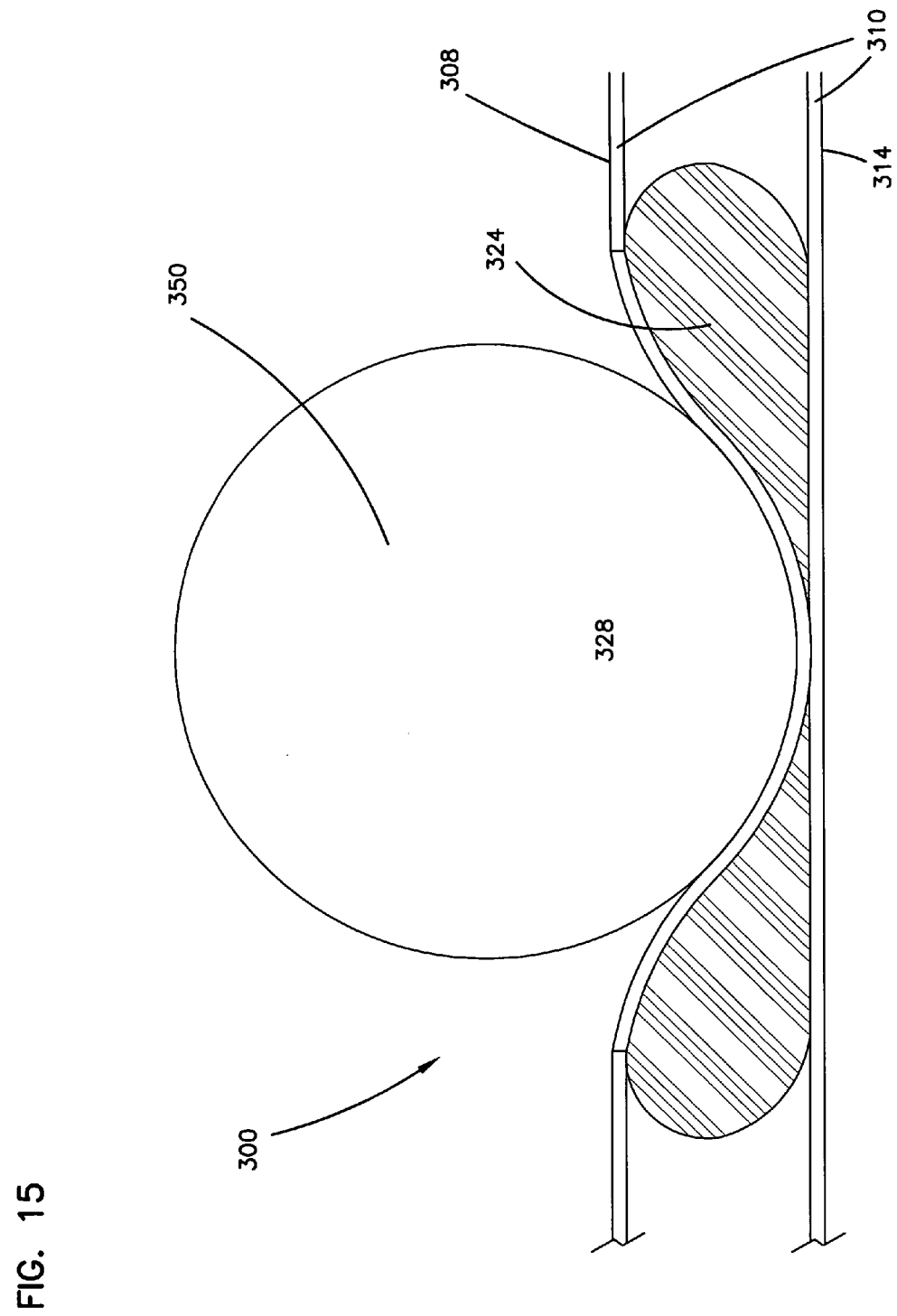
FIG. 15 shows a side elevational view of a method of forming the leading edge of the filter media shown in FIGS. 9-11; and, FIG. 16 shows a side elevational view of a sheet of filter media cut into strips utilizing the method shown in FIG. 15.
Figure 16:
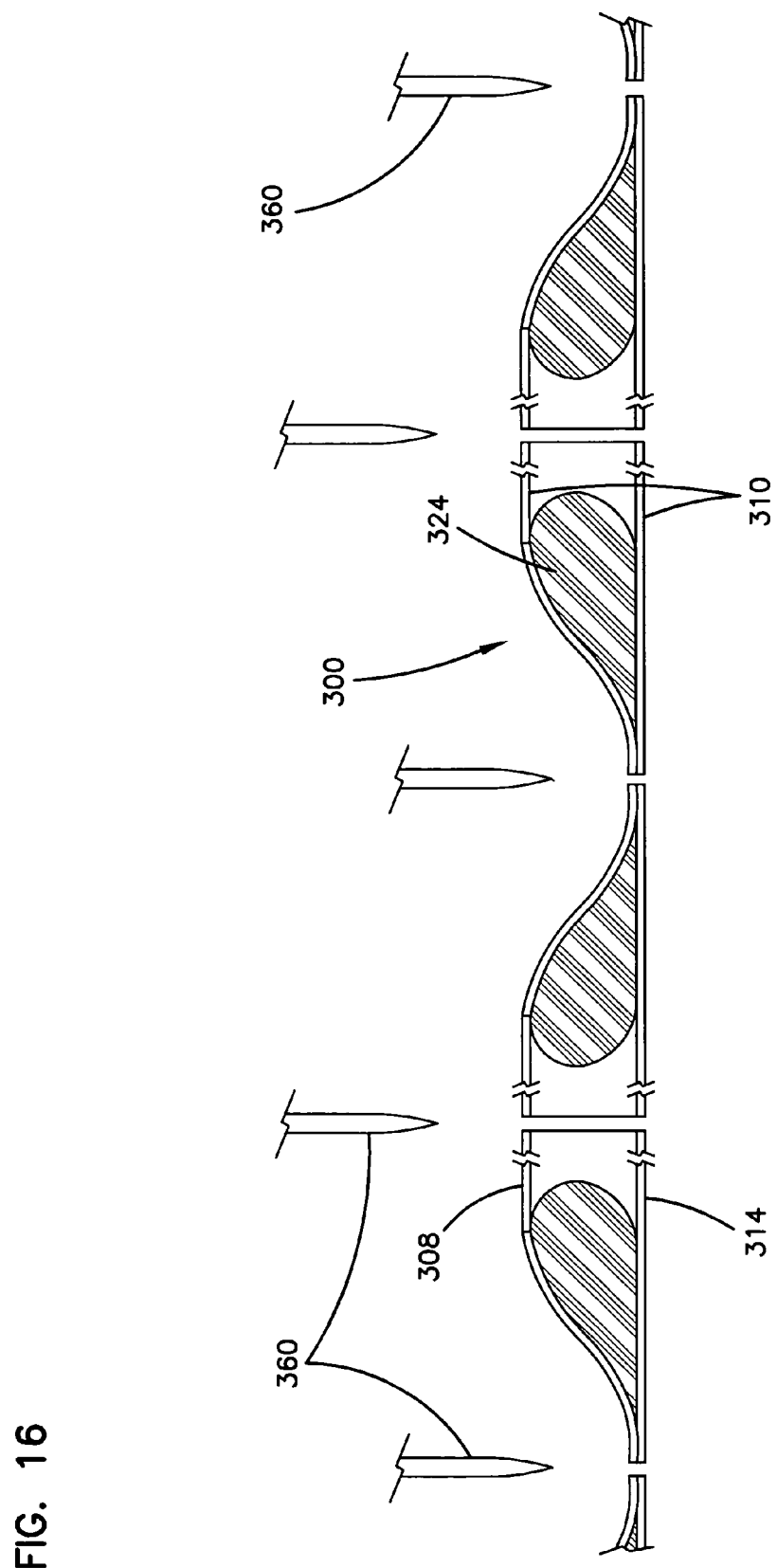

The sloped edge can be formed by a number of methods, however a preferred method is shown in FIGS. 15 and 16. An arced or round forming member 350 is pressed against the upstream bead 324 before the sealing material of the beads is set to provide a quick and easy method of forming an sloping surface 328, as shown in FIG. 15. The forming tool 350 may be a ball which is rolled along the upstream bead 324 or a rounded member which is pressed onto the media 300. After the depression is made, the media 300 is cut with a blade 360 or other cutting tool at the upstream bead 324, thereby forming two strips of filter media 300 having a sloping upstream edge 330, as shown in FIG. 16. It can be appreciated that a number sets of widened alternating beads 324 and 326 may be applied to a sheet of media 300. The upstream beads 324 are then crushed as shown in FIG. 15. When the sealing material of the beads 324 and 326 sets, the sheet of filter media 300 is cut at beads 324 and 326 to form multiple sheets of filter media 300 having crushed upstream edges 300.

Figure 14:
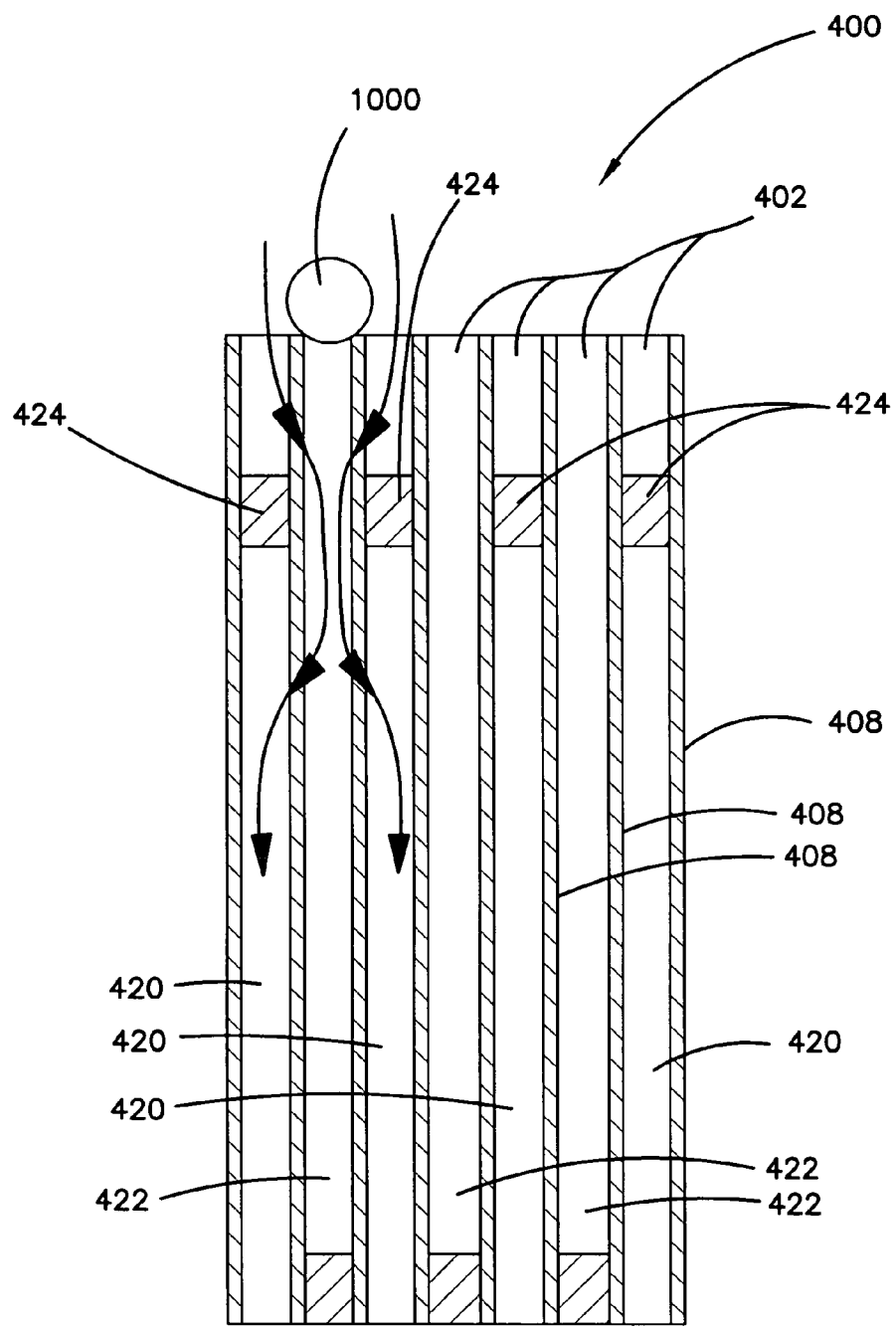
FIG. 14 shows a sectional view of a fourth embodiment of filter media having upstream sealed flutes with a sealed portion recessed from the upstream edge of the filter media according to the principles of the present invention.

Referring now to FIG. 14, there is shown a fourth embodiment of the present invention with fluted filter media 400. The fluted filter media 400 is similar to other fluted filter media, but the fluted filter media 400 has a modified upstream edge and bead configuration, as explained hereinafter. As shown in FIG. 14, the fluted filter media 400 includes flutes 402 having peaks and troughs with flutes 420 closed upstream and flutes 422 closed downstream. However, unlike other fluted filters having alternating chambers sealed at the extreme upstream face of the filter media, the flutes 420 include a bead 424 sealing off the flute chamber which is recessed from the upstream edge of the filter media 400. The flutes 422 have beads 426 which are at the downstream end.

The filter media 400 provides performance advantages as it can be appreciated that large particles 1000 may accumulate at the upstream face of the filter media. As shown in FIG. 14, if the particles 1000 are large enough, some of the flutes 402 may become completely blocked off. For prior filter media, if several flutes are blocked off, the blockage 1000 has greater impact as alternating surrounding flutes are sealed at their upstream side, creating increased flow redirection around the blocked flutes. However, as shown in FIG. 14, when the flutes 420 are sealed at their upstream side at 424 and recessed from the upstream edge, a blockage 1000 of an adjacent downstream closed flute 422 allows the flow to pass into the upstream end of the flutes 420 and through the fluting sheet or other filter material upstream of the seal 424. In this manner, the fluid flows into flute 422 where it is forced back through the filtering material into the flutes 420 which are open to the downstream side of the filter. This reduces clogging and provides for better flow without pressure buildup or otherwise adversely affecting filter performance.

In a preferred embodiment, the upstream sealing beads 424 are recessed from approximately ¼" to 1" from the upstream edge. In this manner, the fluted material is still self supporting while decreasing the effects of clogging at the upstream face of the filter media 400.

Figure 12:
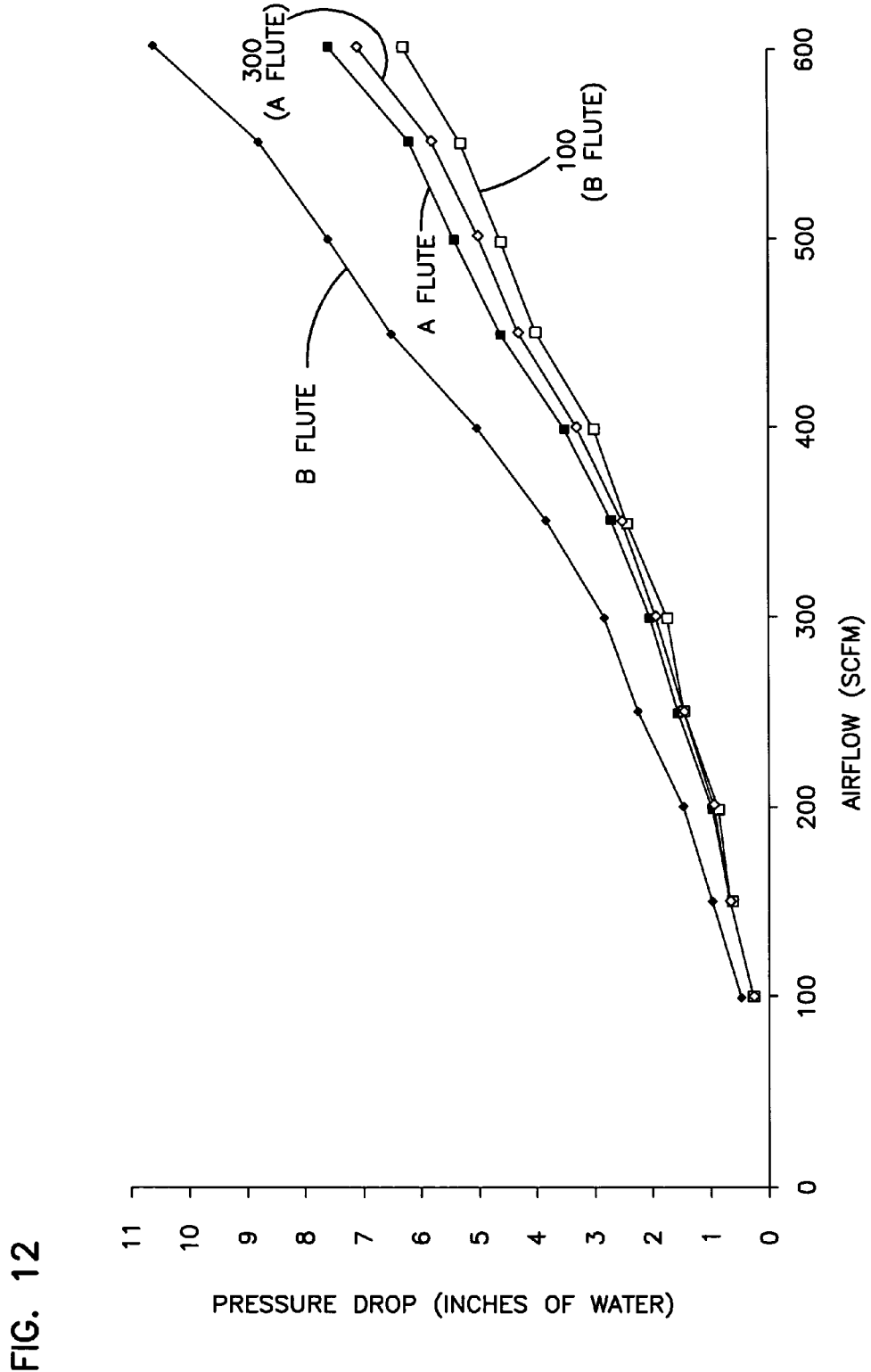
FIG. 12 shows a graph of pressure drop across the filter versus airflow through the filter for various fluted filter media designs.

As shown in FIG. 12, the pressure drop for air flow compares fluted filter media having standard B size flutes to the tapered filter media 100 also having a B size flute. In addition, a standard A size fluted filter media is compared to the crushed filter media 300 having an A size flute. It can be appreciated that the pressure drop across the filter, in both instances, is reduced as compared to the standard fluted filter configuration while having the same filter volume and nominal flute size.

Figure 13:
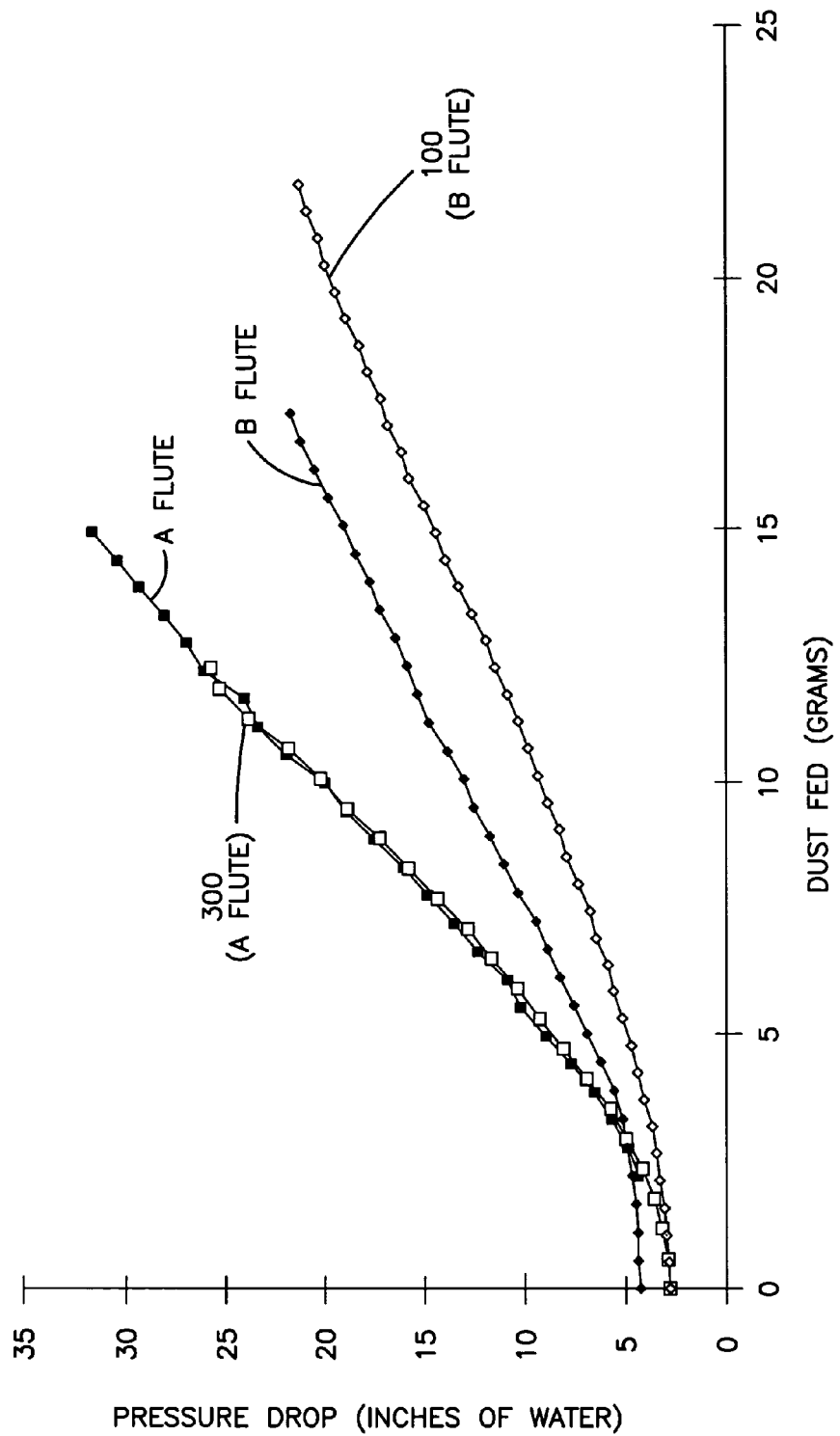
FIG. 13 shows a graph of pressure drop versus dust loading for various fluted filter media designs.

In addition, as shown in FIG. 13, as the filter media becomes loaded with dust, it can be appreciated that a standard B flute has a much higher pressure drop than a B flute with tapered filter media 100. In addition, a size A flute for filter media 300 with a crushed leading edge has a significantly lower initial pressure drop than a standard A flute.

It can be appreciated that with the present invention, filter media is provided which has a substantially greater open area transverse to the flow which intercepts the flow. This provides for increased efficiency with decreased restriction.

It is to be understood, however, that even though numerous characteristics and advantages of the present invention have been set forth in the foregoing description, together with details of the structure and function of the invention, the disclosure is illustrative only, and changes may be made in detail, especially in matters of shape, size and arrangement of parts within the principles of the invention to the full extent indicated by the broad general meaning of the terms in which the appended claims are expressed.

What is claimed is:

1. A method of making fluted air filters; the method including steps of:
   (a) providing an extension of media comprising a fluting sheet having a plurality of flutes secured to a facing sheet with a first sealant bead therebetween;
      (i) the first sealant bead being positioned at a location spaced from edges thereof and extending along a length of media;
   (b) pressing the extension of media in the region of the first sealant bead to form a depression between opposite sloped edges in the fluting sheet; and,
   (c) forming at least one fluted air filter from the resulting extension of media having the depression in the fluting sheet.

2. A method according to claim 1 wherein:
   (a) the step of forming comprises cutting the extension of media through the depression and winding each resulting sheet of media, to from two fluted air filters.

3. A method according to claim 1, wherein the step of pressing the extension of media comprises pressing with an arced forming member.

4. A method according to claim 1, wherein the step of pressing the extension of media comprises pressing with a round forming member.

5. A method according to claim 2, wherein the step of cutting the extension of media comprises cutting with a blade.

* * * * *